United States Patent [19]

Hamilton et al.

[11] Patent Number: 4,789,035

[45] Date of Patent: Dec. 6, 1988

[54] LOAD CELL

[75] Inventors: Martin W. Hamilton, Arlington Hts., Ill.; Kish D. Amlani, Troy, Mich.

[73] Assignee: Eaton Corporation, Cleveland, Ohio

[21] Appl. No.: 173,919

[22] Filed: Mar. 28, 1988

[51] Int. Cl.[4] .......................... G01G 3/14; G01L 1/22
[52] U.S. Cl. ............................ 177/211; 73/862.65
[58] Field of Search ............... 177/211; 73/862.65, 73/862.66

[56] References Cited

U.S. PATENT DOCUMENTS

| | | | |
|---|---|---|---|
| 3,772,912 | 11/1973 | Andersson | 73/862.66 |
| 3,969,935 | 7/1976 | Shoberg | 177/211 X |
| 4,148,219 | 4/1979 | Golding et al. | 73/862.65 |
| 4,338,825 | 7/1982 | Amlani et al. | 73/862.65 |
| 4,423,793 | 1/1984 | Caris | 177/211 |
| 4,520,679 | 6/1985 | Hatamura | 73/862.65 X |
| 4,589,291 | 5/1986 | Sander | 73/862.65 |
| 4,702,329 | 10/1987 | Click | 177/211 |
| 4,733,571 | 3/1988 | Ormond | 73/862.65 |

FOREIGN PATENT DOCUMENTS

| | | | |
|---|---|---|---|
| 20133 | 2/1985 | Japan | 73/862.66 |
| 2162322 | 1/1986 | United Kingdom | 73/862.65 |

*Primary Examiner*—George H. Miller, Jr.
*Attorney, Agent, or Firm*—A. E. Chrow

[57] ABSTRACT

A compression type load cell (50) is provided for measuring a load (L) applied to an object (3). Cell (50) has a first end (7) adapted to receive load (L) thereupon and an opposite end (9) adapted to support cell (50) upon object (3) with end (7) adapted to direct load (L) axially along a central longitudinal axis (x) of cell (50). Cell (50) has a reduced section (8) having a first pair of bores (14,14') therethrough that are preferably oriented substantially transverse to axis (x) and are spaced-apart from each other substantially symmetrically on opposite sides of axis (x). Reduced section (8) has a second pair of bores (16,16') therethrough between bores (14,14') and end (9) that are preferably substantially transverse to axis (x) and respectively axially aligned with bores (14,14'). A pair of slots (19) and (19') extend from outside cell (50) and respectively preferably intersect bores (14,14') for their entire length and a channel (18) extends between and intersects bores (16) and (16') for their entire length providing section (8) with enhanced axial movement between bores (14,14') and (16,16') upon application of load (L) on cell (50) which is measured by strain sensing means mounted on load sensing surfaces (10,12) defined on opposite sides of section (8) between bores (14,14') and (16,16').

12 Claims, 1 Drawing Sheet

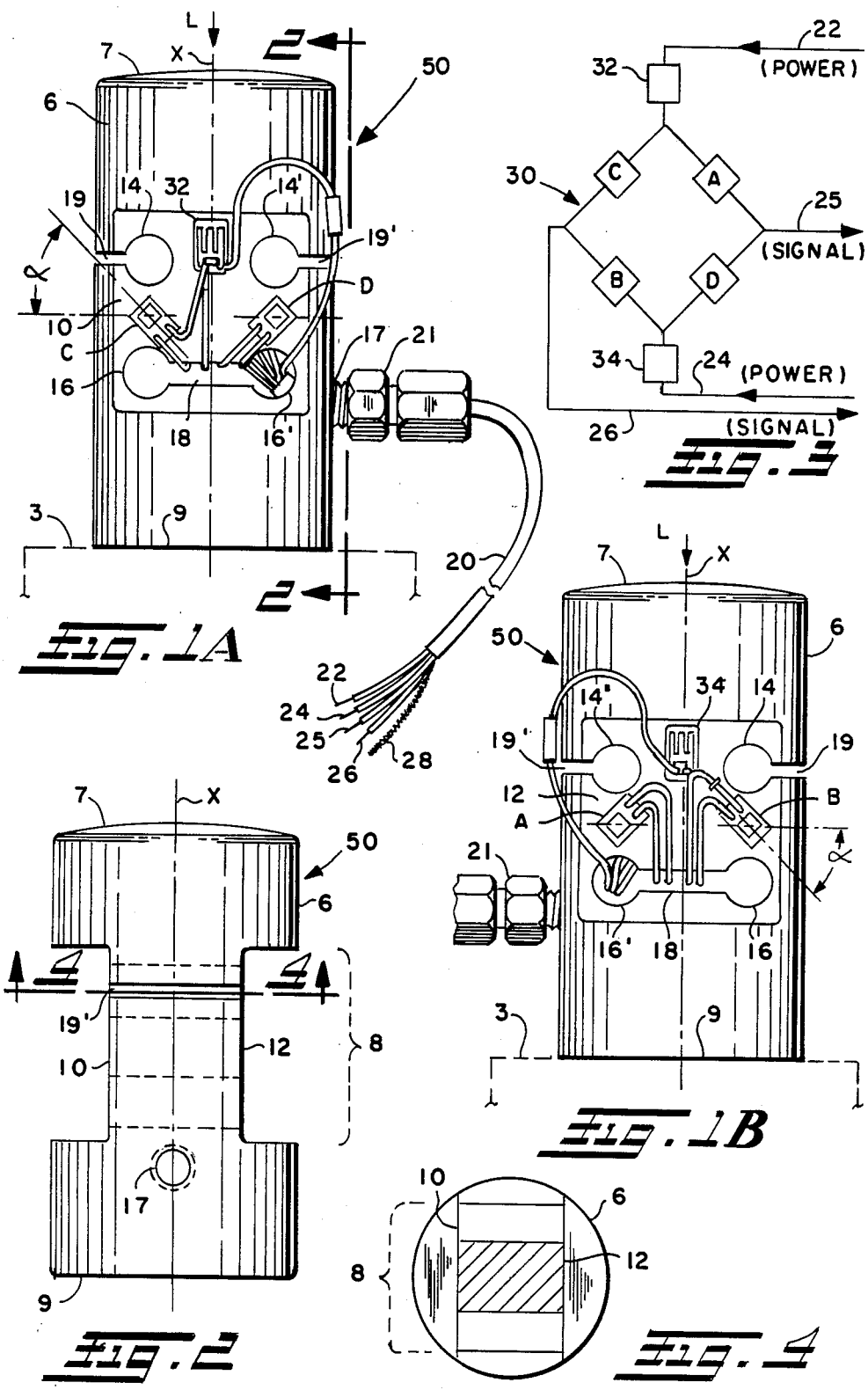

2

LOAD CELL

This invention relates generally to a load cell operative to measure load applied to an object and more particularly to a load cell having a reduced section adapted to enhance measurement of strain induced therein by the load by including two pairs of spaced-apart bores extending through the reduced section defining load sensing surfaces therebetween on opposite sides of the reduced section upon at least one of which is mounted sensing means such as a strain gage operative to sense strain induced therein by the load and provide a signal indicative of the load upon the object.

BACKGROUND OF THE INVENTION

Many load cells have been developed over the years that employ sensing means such as strain gage for measuring the amount of load applied to an object. Such load cells commonly operate on the principle of sensing strain induced by the load therein by sensing means such as strain gages secured to the load cell that have been calibrated to provide an output signal indicative of the load upon the object.

In cases where strain gages are employed, one or more are commonly secured to the load cell and coupled into a Wheatstone bridge arrangement that is located and electrically powered remotely from the cell. Such load cells often include the Wheatstone bridge coupling arrangement mounted directly thereon and include means such as connectors for conveying electric power to the Wheatstone bridge and for conveying the output signal therefrom that is indicative of the load applied to the object through the load cell.

A recent example of a load cell for measuring loads applied to an object is disclosed in U.S. Pat. No. 4,702,329, the disclosure of which is included herein by reference. Although similar in some respects to the load cell of the present invention, the subject load cell has a complex configuration that appears to be costly to manufacture.

In contrast, the load cell of the present invention differs from prior art load cells in many respects as hereinafter described in addition to having a configuration that is simple and inexpensive to manufacture.

SUMMARY OF THE INVENTION

Accordingly, it is an object of this invention to provide a load cell operative to measure load applied to an object.

It is another object of this invention to provide a load cell operative to measure load applied to an object that is simple and inexpensive to manufacture.

It is yet another object of this invention to provide a load cell operative to measure load applied to an object that is highly accurate yet simple and inexpensive to manufacture.

BRIEF DESCRIPTION OF THE DRAWINGS

FIGS. 1A and 1B are respective front and back views of a preferred embodiment of a load cell 50 of the invention;

FIG. 2 is a side view of load cell 50 taken along view line 2—2 of FIG. 1A;

FIG. 3 is a schematic diagram of a preferred Wheatstone bridge arrangement 30 for strain gages C and D of FIG. 1A and strain gages A and B of FIG. 1B; and FIG. 4 is a cross-sectional view of load cell 50 taken along view line 4—4 of FIG. 2.

DESCRIPTION OF SOME PREFERRED EMBODIMENTS

Load cell 50 of FIGS. 1A, 1B, 2 and 4 has a body member 6 having a central longitudinal axis "X". Body member 6 preferably has a cylindrical configuration. Body member 6 has a support end 9 adapted to support it upon an object 3 for measuring a load "L" being applied axially through cell 50 thereagainst. Body member 6 has an opposite head receiving end 7 that is adapted to receive and direct load "L" axially along axis "X". End 7 preferably has a dome shaped configuration with its apex substantially axially aligned with axis "X" as a means for directing load "L" along axis "X".

Body member 6 has a dimensionally reduced section 8 between ends 7 and 9 of which a preferred configuration is shown in FIG. 2. Reduced section 8 is adapted to enhance measurement of strain induced therein by load "L" upon body member 6.

Section 8 has a first pair of spaced-apart bores 14 and 14' disposed therethrough between ends 7 and 9 of body member 6. Bores 14 and 14' are preferably, respectively, substantially, symmetrically disposed on opposite sides of axis "X" and extend through section 8 in a generally transverse relationship thereto.

A second pair of spaced-apart bores 16 and 16' are disposed through section 8 between bores 14 and 14' and end 9 of body member 6. Bores 16 and 16' are respectively, preferably, substantially, symmetrically disposed on opposite sides of axis "X" and extend through section 8 in generally transverse relationship thereto. Bores 14 and 16 and bores 14' and 16' are preferably, respectively, axially aligned as shown in FIGS. 1A and 1B and preferably have substantially the same diameter.

Bores 16 and 16' are spaced axially apart from bores 14 and 14' for a distance defining load sensing surfaces 10 and 12 therebetween on opposite sides of section 8.

As shown in FIGS. 2 and 4, surfaces 10 and 12 are preferably, substantially flat and are in substantial parallel alignment with each other with section 8 preferably having a substantially rectangular cross-section when viewed axially as shown in FIG. 4.

Slots 19 and 19' respectively extend from the outside of body member 6 and intersect bores 14 and 14' along their entire length. The effect of slots 19 and 19' and of bores 14 and 14' is to concentrate load "L" axially across the reduced area of section 8 between bores 14 and 14'.

A channel 18 extends through section 8 between bores 16 and 16' and intersects them both for their entire length. The effect of bores 16 and 16' and channel 18 is to create a vertical movement to section 8 between bores 14, 14' and 16, 16' to enhance strain induced therein by load "L" to improve accuracy and sensitivity in measuring load "L".

Strain induced by load "L" in the region of section 8 between bores 14, 14' and 16, 16' is measured by suitably securing sensing means such as at least one strain gage to surface 10 or 12.

The use of strain gages for measuring strain is well known in the art. Generally, the strain gage (which is an electrical resistor) is secured so intimately to the substrate being subjected to a load that it stretches or contracts along with the substrate according to its orientation relative the load and substrate and thereby changes its resistance which can then be monitored and calibrated according to known loads applied to the substrate.

The sensing means of cell 50 preferably comprises four strain gages comprising a first pair ("C" and "D") secured on surface 10 as shown in FIG. 1A and a second pair ("A" and "B") secured to surface 12 as shown in FIG. 1B.

Strain gages "A" and "B" and "C" and "D" are respectively, symmetrically disposed on opposite sides of axis "X" with strain gages "B" and "C" preferably, axially aligned with bores 14 and 16 and strain gages "A" and "D" preferably, axially aligned with bores 14' and 16'.

Strain gages "C" and "D" are preferably, respectively oriented towards end 7 of body member 6 at an angle alpha from axis "X" which is preferably about 45 degrees. Strain gages "A" and "B" are preferably, respectively oriented towards end 9 of body member 6 at an angle alpha from axis "X" which likewise is preferably about 45 degrees.

Strain gages "A", "B", "C" and "D" are preferably connected together in a Wheatstone bridge arrangement 30 shown in FIGURE such that strain gages "A" and "B" and strain gages "C" and "D" are respective opposite legs of Wheatstone bridge, 30.

Strain gages "A" and "C" are connected together by connector 32 as shown in FIGS. 1A and 3.

Strain gages "B" and "D" are connected together by connector 34 as shown in FIGS. 1B and 3. As shown in FIGS. 1A and 1B, channel 18 provides a convenient passageway between surfaces 10 and 12 for wiring connecting the strain gages together to provide Wheatstone bridge 30.

An electrical cable 20 is connected to body member 6 by means of coupling 21 which is preferably in threaded securement with threaded hole 17 in body member 6 shown in FIG. 2. Cable 20 includes a pair of electrical power conductors 22 and 24 for conveying electrical power to Wheatstone bridge 30, and a pair of signal conductors 25 and 26 for conveying the electrical signal generated by Wheatstone bridge 30 in response to changes in resistance of strain gages "A", "B", "C" and "D" caused by strain induced in section 8 by load "L". Cable 20 preferably includes a grounded shield 28 and/or ground wire for minimizing the effect of exterior noise upon the output signal produced by Wheatstone bridge 30 as is well known to those skilled in the art.

Load cell 50 is calibrated by correlating the output signal from Wheatstone bridge 30 for known loads and will differ, of course, according to the material, location of the strain gages and various dimensional characteristics of cell 50.

By way of example, a preferred form of load cell 50 is provided where body member 6 is made from a suitable stainless steel and has a cylindrical configuration having a length of about 4¼ inch and a diameter of about 2½ inch. Bores 14, 14', 16 and 16' respectively have a diameter of about ⅛ inch and are axially spaced about 1 inch apart and transversely about 1⅛ inch apart from each other.

Section 8 has an axial length of about 1⅞ inch and a rectangular cross section of about 1¼ inch between surfaces 10 and 12 by about 2 inch with slots 19 and 19' having a breadth of about ⅛ inch and channel 18 having a breadth of about ½ inch.

Although not shown in the FIGURES, load cell 50 preferably includes a protective sleeve or cover plates that are suitably secured to body member 6 for protecting strain gage(s) secured to section 8 from contamination and damage.

What is claimed is:

1. A load cell for measuring load applied to an object, said load cell comprising;
   a body member having a central longitudinal axis, said body member having a support end adapted to support the body member upon the object and an opposite load receiving end adapted to receive and direct the load axially along the longitudinal axis, and said body member have a reduced section between the load receiving and support ends adapted to enhance measurement of the load upon the body member,
   a first pair of bores disposed through the reduced section, said bores substantially symmetrically disposed on opposite sides of the longitudinal axis in substantial transverse relationship thereto,
   a second pair of bores disposed through the reduced section between the first pair of bores and the body member support end, said bores substantially symmetrically disposed on opposite sides of the longitudinal axis in substantial parallel alignment with the first pair of bores and axially spaced-apart therefrom for a distance defining a load sensing surface therebetween on opposite sides of the reduced section,
   respective slots extending from the outside of the body member and intersecting each of the first pair of bores along the entire length thereof,
   a channel disposed through the reduced section and extending between and intersecting the second pair of bores along the entire length thereof, and
   sensing means mounted on at least one of the load sensing surfaces for sensing strain induced therein by the load and thereby enabling measurement of the load upon the object.

2. The load cell of claim 1 wherein first and second pair of bores are respectively, substantially, axially aligned.

3. The load cell of claim 1 wherein the sensing means comprises strain gage sensing means.

4. The load cell of claim 1 wherein the sensing means comprises four strain gages coupled together in a Wheatstone bridge arrangement having first and second opposite legs respectively provided by a first pair of the strain gages mounted on one of the body member load sensing surfaces to provide said first opposite legs and a second pair of the strain gages mounted on the other of the body member load sensing surfaces to provide said second opposite legs and the body member includes means for conveying power to the Wheatstone bridge and for conveying a signal provided thereby indicative of the load upon the object.

5. The load cell of claim 4 wherein the first and second pair of strain gages are respectively substantially symmetrically disposed on opposite sides of the longitudinal axis with the first pair of strain gages oriented towards the body member load receiving end at about 45 degrees from the body member longitudinal axis and the second pair of strain gages oriented towards the body member support end at about 45 degrees from the body member longitudinal axis.

6. The load cell of claims 4 or 5 wherein the body member first and second bores are substantially, axially aligned and the four strain gages are respectively substantially axially aligned therewith.

7. A load cell for measuring load applied to an object, said load cell comprising;
- a body member having a longitudinal axis, said body member having a support end adapted to support the body member on the object and an opposite load receiving end adapted to receive and direct the load axially along the longitudinal axis, said body member having a reduced section between the load receiving and support ends adapted to enhance measurement of the load upon the body member,
- a first pair of bores disposed through the reduced section, said bores substantially symmetrically disposed on opposite sides of the longitudinal axis in substantial transverse relationship thereto,
- a second pair of bores disposed through the reduced section between the first pair of bores and the body member support end, said bores in substantially parallel alignment with the first pair of bores and in respective substantial axial alignment therewith and axially spaced therefrom for a distance defining a load sensing surface therebetween on opposite sides of the reduced section,
- respective slots extending from the outside of the body member and intersecting each of the first pair of bores along the entire length thereof,
- a channel disposed through the reduced section and extending between and intersecting the second pair of bores along the entire length thereof,
- sensing means mounted on both of the load sensing surfaces for sensing strain induced therein by the load and thereby enabling measurement of the load upon the object, said sensing means comprising four strain gages coupled together in a Wheatstone bridge arrangement having first pair of opposite legs respectively provided by a first pair of the strain gages mounted on one of the sensing surfaces and a second pair of opposite legs provided by a second pair of the strain gages mounted on the other of the sensing surfaces,
- means for conveying power to the Wheatstone bridge, and
- means for conveying a signal provided thereby indicative of the load upon the object.

8. The load cell of claim 7 wherein the first and second pair of strain gages are respectively substantially axially with the first and second pair of bores with the first pair of strain gages respectively oriented towards the body member load receiving end at about 45 degrees from the body member longitudinal axis and the second pair of strain gages respectively oriented towards the body member support end at about 45 degrees from the body member longitudinal axis.

9. The load cell of claims 1 or 7 wherein the body member has a generally cylindrical configuration.

10. The load cell of claims 1 or 7 wherein the reduced system has a generally rectangular cross section in a direction substantially transverse to the body member longitudinal axis.

11. The load cell of claims 1 or 7 wherein the body member load receiving end has a generally dome shaped configuration with the apex thereof in substantial alignment with the body member longitudinal axis.

12. The load cell of claims 1 or 7 wherein the first and second pair of bores have substantially the same diameter.

* * * * *